United States Patent
Holmes et al.

(10) Patent No.: US 11,417,340 B2
(45) Date of Patent: Aug. 16, 2022

(54) FAULT DETECTION AND MANAGEMENT IN A REAL-TIME COMMUNICATION

(71) Applicant: Avaya Inc., Santa Clara, CA (US)

(72) Inventors: Darren Holmes, Waterlooville (GB); Jibin George, Pune (IN); Salil Dhawan, Pune (IN); Sandeep Goynar, Pune (IN); Harsimran Jeet Singh, Pune (IN)

(73) Assignee: Avaya Inc., Santa Clara, CA (US)

( * ) Notice: Subject to any disclaimer, the term of this patent is extended or adjusted under 35 U.S.C. 154(b) by 153 days.

(21) Appl. No.: 16/714,985

(22) Filed: Dec. 16, 2019

(65) Prior Publication Data

US 2021/0183394 A1 Jun. 17, 2021

(51) Int. Cl.
*G10L 15/26* (2006.01)
*H04L 67/10* (2022.01)
*G10L 15/22* (2006.01)

(52) U.S. Cl.
CPC .............. *G10L 15/26* (2013.01); *G10L 15/22* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 7,130,404 B2 | 10/2006 | Coles et al. | |
| 7,844,454 B2 | 11/2010 | Coles et al. | |
| 8,233,606 B2 | 7/2012 | Brunson | |
| 8,345,849 B2 | 1/2013 | Lee et al. | |
| 8,442,197 B1 | 5/2013 | Mazza et al. | |
| 8,767,935 B2 | 7/2014 | Gartner et al. | |
| 8,842,813 B2 | 9/2014 | Gartner | |
| 9,154,629 B2 | 10/2015 | John et al. | |
| 2015/0100315 A1* | 4/2015 | Bianco | H04L 65/4015 704/235 |
| 2017/0125019 A1* | 5/2017 | Ganesan | H04W 64/006 |
| 2018/0373488 A1* | 12/2018 | Chisu | H04N 21/234336 |
| 2020/0265856 A1* | 8/2020 | Gummadi | G10L 25/84 |
| 2021/0075906 A1* | 3/2021 | Walton | H04M 3/2281 |

* cited by examiner

*Primary Examiner* — Stella L. Woo
(74) *Attorney, Agent, or Firm* — Sheridan Ross P.C.

(57) ABSTRACT

Electronic conferences are a common method of conducting a meeting when the participants are not at the same location. When a conference drops a portion of the audio, such carrying speech from a speaker, participants may be excluded from the full content of the conference. By having a device associated with a speaking participant convey both audio and generated text from the speech provided by the speaking participant, a server may be able to determine that speech is missing from the audio portion and automatically insert text content. As a result, poor audio quality may be mitigated with text and omitting unwanted text when the audio quality is sufficient.

20 Claims, 4 Drawing Sheets

FAULT DETECTION AND MANAGEMENT IN A REAL-TIME COMMUNICATION

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for communication via a network and particularly to fault management in real-time communications.

BACKGROUND

Tele-conferences, electronic conferencing, video conferencing, etc., are popular means for two or more people to meet virtually. Audio and/or video, and optionally other content such as co-browsing, document sharing, still images, etc., may be presented by one participant and seen or heard by other participants via their respective communication devices communicating via a network. Despite advancements, quality issues often occur during a particular electronic conference. For example, audio (voice) quality issues may occur, such as due to packet loss or low bandwidth. While participants may interrupt a speaker and ask for the missed speech to be repeated, often participants will say nothing, and the conference will continue on with the speaker incorrectly believing they have been understood and the recipient absent at least some of the content of the electronic conference.

SUMMARY

By way of a broad overview, and as one embodiment, client-centric approach is provided to detect if an incoming speech path from an electronic conference audio (e.g., a speaker) is impaired and, if so, takes corrective action accordingly.

As used herein, "electronic conference," or for the sake of simplicity, just "conference" refers to an electronic communication comprising audio (e.g., speech) and/or video or other visual content (e.g., graphics, still images, co-browsing, etc.) is conveyed between two or more communication devices (e.g., computers, audio-only telephones, smart phones, video phones, etc.) via a network.

In one embodiment, a conference client (e.g., communication device, network connected computer, etc.) will execute a speech-to-text transcription service continually during a conference. The resulting text is then sent to a conference server or other computing device executing a conference monitoring and response application, such as a, 'Conversation Quality Monitor and Communication Controller'.

In another embodiment, the 'Conversation Quality Monitor and Communication Controller' receives and records the text transcripts and monitors the audio channel (e.g., voice stream) and, if the controller detects the incoming speech path is impaired with then add the transcript into the conference's video portion and may indicate that the transcript is being presented due to insufficient audio quality.

The affected users may have their speech path replaced with the transcript. Additionally or alternatively, a user may be graphically represented with the text transcript in an associated speech bubble. The text transmission may be sent via a method with retransmit to ensure that the text transcript received by a client device is complete and, if not, the absent portion is resent.

In another embodiment, the conference server may determine absent parts of speech and insert determined text into the transcript. Additionally or alternatively, text associated with sufficiently "stale" portions of the conference may be timestamped or otherwise identified as being for a prior portion of the conference or, optionally, omitted.

In another embodiment, such as when video is not being utilized (e.g., a client is an audio-only telephone) the text may be converted back to speech The particular text-to-speech (TTS) engine and/or configuration may be determined in association with a profile for the speaker to provide generated speech more closely resembling the speech of the speaker.

Providing speech that was dropped due to bad audio has limits. For example, parts of words or single words that are absent may be readily determined. However, as more speech is lost, the ability to determine what the absent speech was, or would likely have been, becomes less accurate. If words or phrases cannot be determined with sufficient certainty, the absent text may be identified with a placeholder symbol or cue, such as a time gap represented or an estimate of the number of words that were absent based on the speakers rate of speaking. Generated speech may comprise, in whole or in part, retrieved speech for the absent phonemes, words, or phrases that have previously been captured and stored in a non-transitory data storage for the speaker with the absent speech.

The communication controller may also use text to speech conversion with smoothing logic to fit it in with the sound on tone of the other parts of the speech that are not lost.

These and other needs are addressed by the various embodiments and configurations of the present invention. The present invention can provide a number of advantages depending on the particular configuration. These and other advantages will be apparent from the disclosure of the invention(s) contained herein.

In one embodiment, a system is disclosed, comprising: a network interface to a network; a processor with access to a non-transient memory; and wherein the processor performs: receiving content from a primary device and broadcasting content to a secondary device, each via the network, and wherein the content received from the primary device comprises an audio portion and a text portion, wherein the audio portion comprises speech from a primary user associated with the primary device and the text portion comprising text generated from the speech; determining whether the audio portion is complete; upon determining the audio portion is complete, broadcasting the content comprising the audio portion; and upon determining the audio portion is not complete, broadcasting the content comprising the text portion.

In another embodiment, a method is disclosed, comprising: receiving content from a primary device and broadcasting content to a secondary device, each via a network, and wherein the content received from the primary device comprises an audio portion and a text portion, wherein the audio portion comprises speech from a primary user associated with the primary device and the text portion comprising text generated from the speech; determining whether the audio portion is complete; upon determining the audio portion is complete, broadcasting the content comprising the audio portion; and upon determining the audio portion is not complete, broadcasting the content comprising the text portion.

In another embodiment, a system is disclosed, comprising: means to receive content from a primary device and broadcasting content to a secondary device, each via a network, and wherein the content received from the primary device comprises an audio portion and a text portion, wherein the audio portion comprises speech from a primary user associated with the primary device and the text portion comprising text generated from the speech; means to determine whether the audio portion is complete; upon determining the audio portion is complete, means to broadcast the content comprising the audio portion; and upon determining the audio portion is not complete, means to broadcast the content comprising the text portion.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall rover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
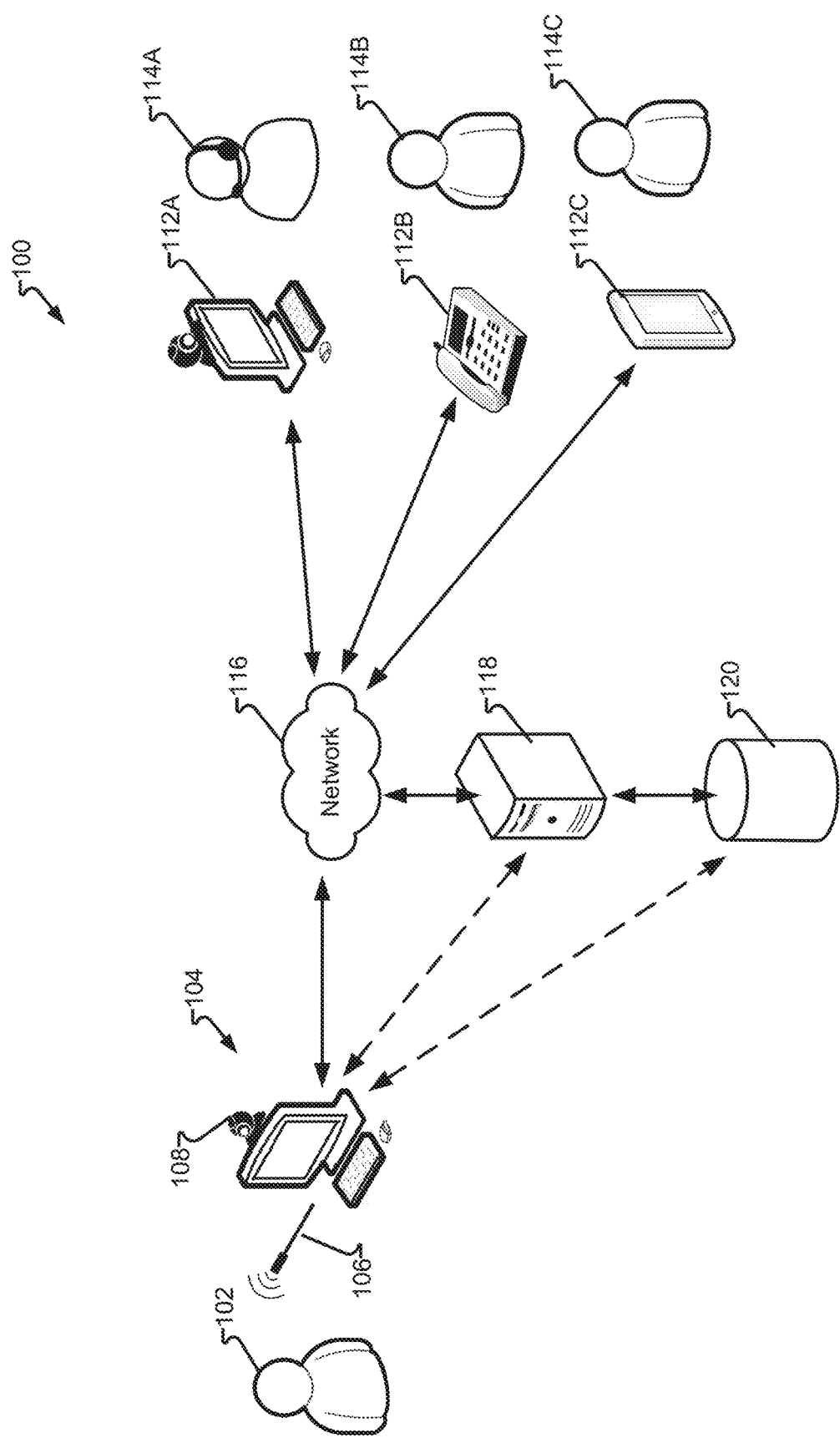
FIG. 1 depicts a first system in accordance with embodiments of the present disclosure.

FIG. 1 depicts system 100 in accordance with embodiments of the present disclosure. In one embodiment primary user 102 is engaged in an electronic conference with one or more secondary users 114. The conference comprises signals captured from primary user 102, for example, microphone 106 captures speech provided by primary user 102 optional camera 108 captures images of primary user 102, or other subject. Primary communication device 104 then encodes the captured signals (e.g., apply a audio/video CODEC) for transmission via network 116 to one or more secondary device 112 for decoding and presentation to one or more secondary user 114. In one embodiment, primary user 102 is a currently speaking user. Primary user 102 may become one of secondary user 114, such as when one of secondary user 114 becomes the speaking user and, therefore, primary user 102.

Primary communication device 104 comprises at least microphone 106 and a network interface to network 116. Secondary devices 112 are variously embodied and may comprise a personal computer, such as illustrated in secondary device 112A; a voice-only telephone, such as illustrated by secondary device 112B, a smart phone, such as illustrated by secondary device 112C. Each of secondary device 112 comprise at least an audio presentation device, to present decoded audio signals received via a network interface to network 116 to the associated secondary user 114. Secondary devices 112 may comprise other features, such as video capture/display, text capture/display, audio capture, and/or other features.

In one embodiment, network 116 comprise a public network (e.g., internet), but additionally or alternatively may comprise other wired networks (e.g., ethernet) and/or wireless networks (e.g., cellular telephony, WiFi, Bluetooth, etc.). Accordingly, devices comprising a network interface comprise the appropriate hardware for use with the particular embodiment of network 116 (e.g., cellular, WiFi, Bluetooth, antenna, network interface chip/card, etc.).

Server 118 may monitor the conference. In another embodiment, server 118 may perform conference hosting services, such as managing invitations, floor control, adding/dropping participants, determining which device will be primary communication device 104 and which device(s) will be secondary devices 112 at a particular time, etc. In another embodiment, server 118 receives speech from primary user 102 from primary communication device 104 and also receives text, comprising the output of a speech-to-text conversion executed by at least one processor of primary communication device 104. Server 118 may be a dedicated server comprising at least one processor, a shared processing device, or distributed across a plurality of computing appliances (e.g., "cloud" processor).

Data storage 120 is embodied as a non-transitory data storage that may be integrated into server 118 or accessible to at least one processor of server 118. Data storage 120 may be further embodied as an internal or external storage device, appliance, array, etc. In yet another embodiment data storage 120 may be maintained across a plurality of shared storage device (e.g., "cloud" storage).

It should be appreciated that system 100 may be embodied in a different network topology without departing from the scope of the embodiments. For example, server 118 is shown as a separate node to network 116, however, in other embodiments, primary communication device 104 and/or one or more of secondary device 112 may comprise or connect directly to server 118. For example, server 118 may comprise ports, switches, or other connection hardware as an alternative or addition to connectivity to network 116. As mentioned above, data storage 120 may be a discrete device or devices or integrated into server 118, primary communication device 104, or one or more of secondary device 112. Data storage 120 may be a single storage device or duplicated for redundancy and/or load balancing across a plurality of devices.

As will be discussed more completely with respect to embodiments that follow, Primary communication device 104 provides audio and text to server 118. Server 118 broadcasts the content of the conference, received at least in part as the audio from primary communication device 104, to the other participants (secondary user 114) via their respective secondary device 112. In the event the audio portion from primary communication device 104 is absent or of insufficient quality, server 118 includes the text portion received from primary communication device 104 in the content of the conference. Accordingly, primary communication device 104 preferably continuously coverts and provides text derived from the speech provided by primary user 102 to server 118 for the entire duration of the conference.

Figure 2:
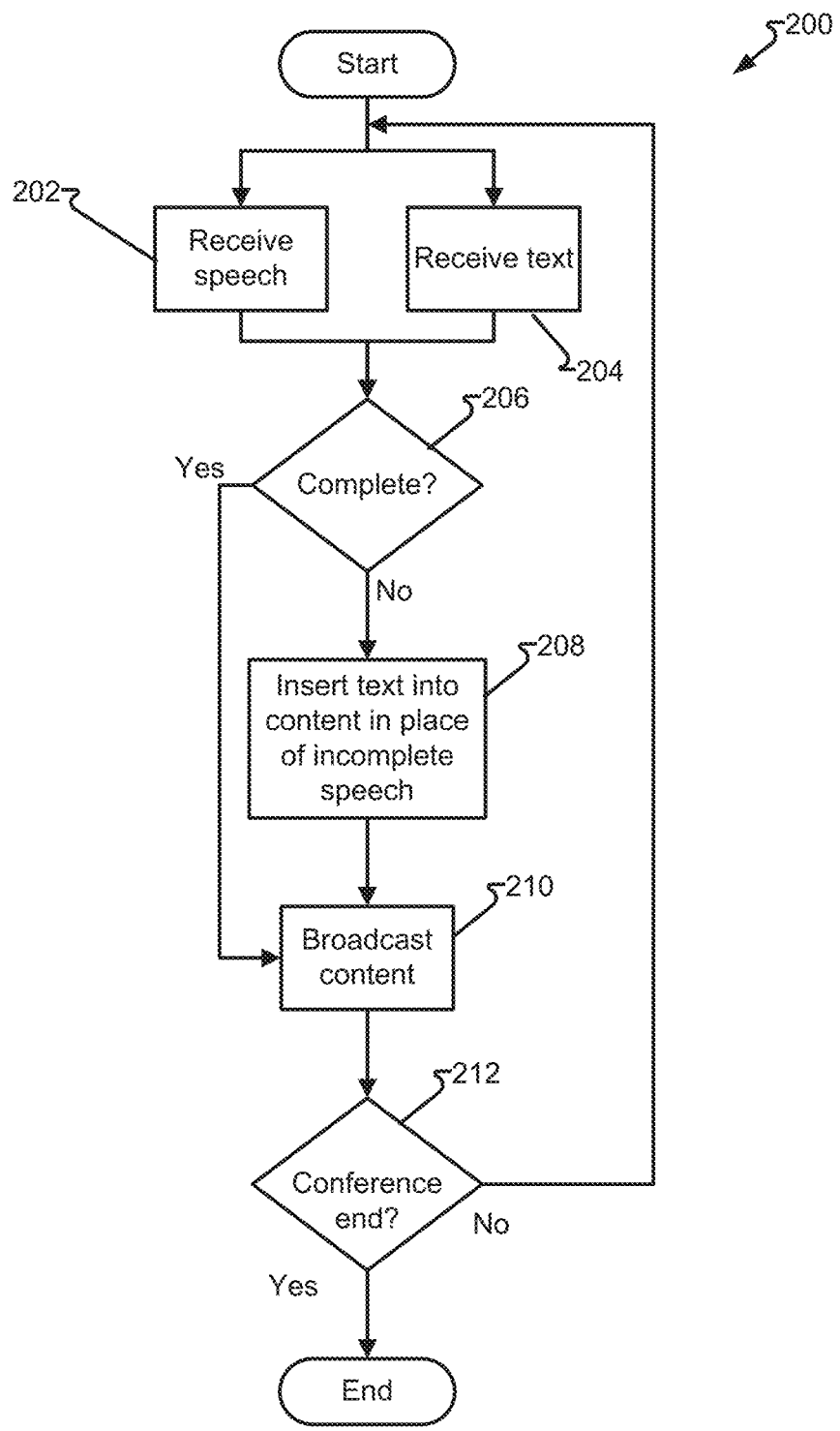
FIG. 2 depicts a process in accordance with embodiments of the present disclosure.

FIG. 2 depicts process 200 in accordance with embodiments of the present disclosure. Process 200 may be embodied as machine-readable and executable instructions for execution by a processor, such as at least one processor of server 118. As a further option, machine executable instructions for the execution of process 200 may be stored in a memory, storage media, or other non-transitory data storage, such as a memory or storage component of server 118 and/or data storage 120.

In one embodiment, process 200 begins and in step 202 speech is received, such as via an audio channel conveying audio from primary communication device 104 to server 118 for broadcast as a portion of conference content to at least one secondary device 112. The audio may comprise data packets encoded for real-time audio transmission via network 116 and, similarly, text may comprise data packets encoded for text transmission via network 116. While steps 202 and 204 are illustrated as occurring in parallel, steps 202 and 204 may alternate during a conference. Next, test 206 determines if the speech is complete or if there is speech absent, such as due to dropped data packets or otherwise absent data or insufficient data to provide comprehensible speech to a listener (e.g., secondary user 114). If test 206 is determined in the affirmative, processing may continue to step 210. Otherwise, if test 206 is determined in the negative, processing continues to step 208.

Step 208 inserts text into the conference content. The conference content comprises, at least, audio from primary user 102, but when test 206 determines that speech is absent, the absent portion may be provided as text, such as for presentation on a display component of secondary device 112. Devices may be absent a display component or configured to not use a display component or to always use an audio presentation component (e.g., speaker) and, if so, the conference content may be presented as speech, received in step 202, and/or machine generated speech from text received in step 204. The resulting content is broadcast in step 210. Then if, test 212 determines the conference has ended, process 200 may be terminated otherwise, processing may loop back to continue receiving speech and/or text in steps 202 and 204, respectively.

Figure 3:
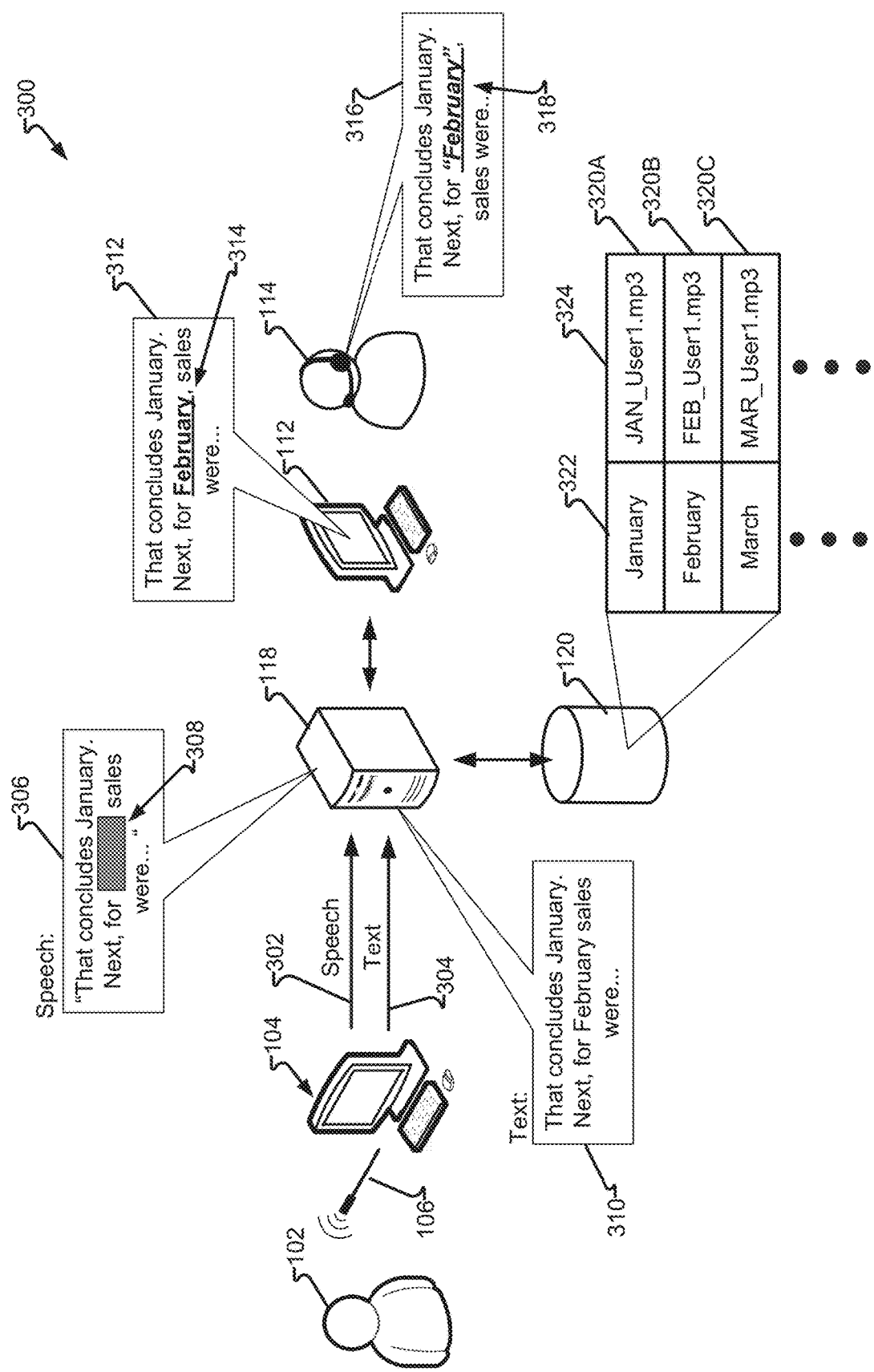
FIG. 3 depicts a second system in accordance with embodiments of the present disclosure.

FIG. 3 depicts system 300 in accordance with embodiments of the present disclosure. In one embodiment, system 300 comprises portions of other systems, including process 200, but omitting components not essential to describe the embodiments for the sake of avoiding unnecessarily complicating the figure and description. It should be appreciated that the embodiments described herein, including system 300, contemplate the use of other routine and ordinary computing, data storage, human-machine interface, and networking components readily understood by those of ordinary skill in the art.

In one embodiment, primary user 102 utilizes primary communication device 104 to provide speech as a portion of a conference being broadcast by server 118 to secondary device 112 and presented to secondary user 114. Primary user 102 speaks and sound energy is captured by microphone 106 and converted into electrical signals and encoded by primary communication device 104 for transmission to server 118 via network 116 (see FIG. 1). Primary communication device 104 also executes a speech-to-text process. The resulting speech transmitted, via audio channel 302, to server 118 and the text generated from the speech transmitted, via text channel 304, to server 118.

At least one processor of server 118 may encounter absent speech. For example, received speech (audio) 306 may comprise absent speech 308. Text transmission is generally more robust in that the volume of data is considerably less and the time to retransmit, such as due to a dropped data packet, is of no consequence to give a user (e.g., secondary user 114) the appearance of real-time text. However, if the text lags behind the voice to a significant degree, such as ten or fifteen seconds, or as otherwise determined and configured for use by server 118, the text may be omitted or tagged with an identifier so a user understands that the text is not associated with the speech that is currently being presented. The tag may be to append a delay indicator, such as "16 seconds: '. . . for February sales . . .'" or, more simply, "Out of sequence" other identifier.

Received text 310, received via text channel 304 may comprise a more complete record of the speech, even when the speech portion, received speech 306 comprises omissions. Accordingly, the conference content provided by server 118 is appended with text, such as presented text 312 comprising the absent speech portion 314. Presented text 312 may be padded, ahead of and/or after absent speech portion 314. For example, a sentence or previously number of words before and/or after absent speech portion 314 may be provided such that a user is able to properly have context that would be more difficult if the absent speech portion 314, alone, was provided. However, in certain embodiments, such as when primary user 102 is speaking slowing, only including absent speech portion 314 may be sufficient and, therefore, the number of words before and/or after, may be zero or dynamically determined by server 118, such as base on the pace of speech of primary user 102.

Additionally or alternatively, presented speech portion 316 may be appended to present absent audio portion 318 of the absent speech 308, such as by text-to-speech generation of the absent speech. While the absent speech may be generated from received text 310 for presentation as, at least a portion of presented speech portion 316, data storage 120 may comprise audio recordings of primary user 102 saying the absent speech. For example, data storage 120 may comprise a data structure with records 320 having text field 322 and associated audio data 324, such as a sound file or location of a sound file. Accordingly, an absent word, like "February" may have been previously recorded and available in data storage 120 such that server 118, if it is determined that such a phonic element, word, or phrase exists, may insert the sound and maintain a complete speech record. It should be appreciated that playback of a recording to present absent audio portion 318 may comprise altering the pace, pitch, timber, or other element to more closely match the playback of the recorded sound to the remaindered of speech portion 316.

While the conference content may comprise speech, such as received via speech channel 302, other content, such as video may also be received and included in the conference content. In another embodiment, text 310 and speech 306 may each be included in the conference content or only one, to the omission of the other. For example, presented text 312 may be presented with the associated presented speech portion 316 omitted. When speech is not absent, presented text 312 may be omitted.

Figure 4:
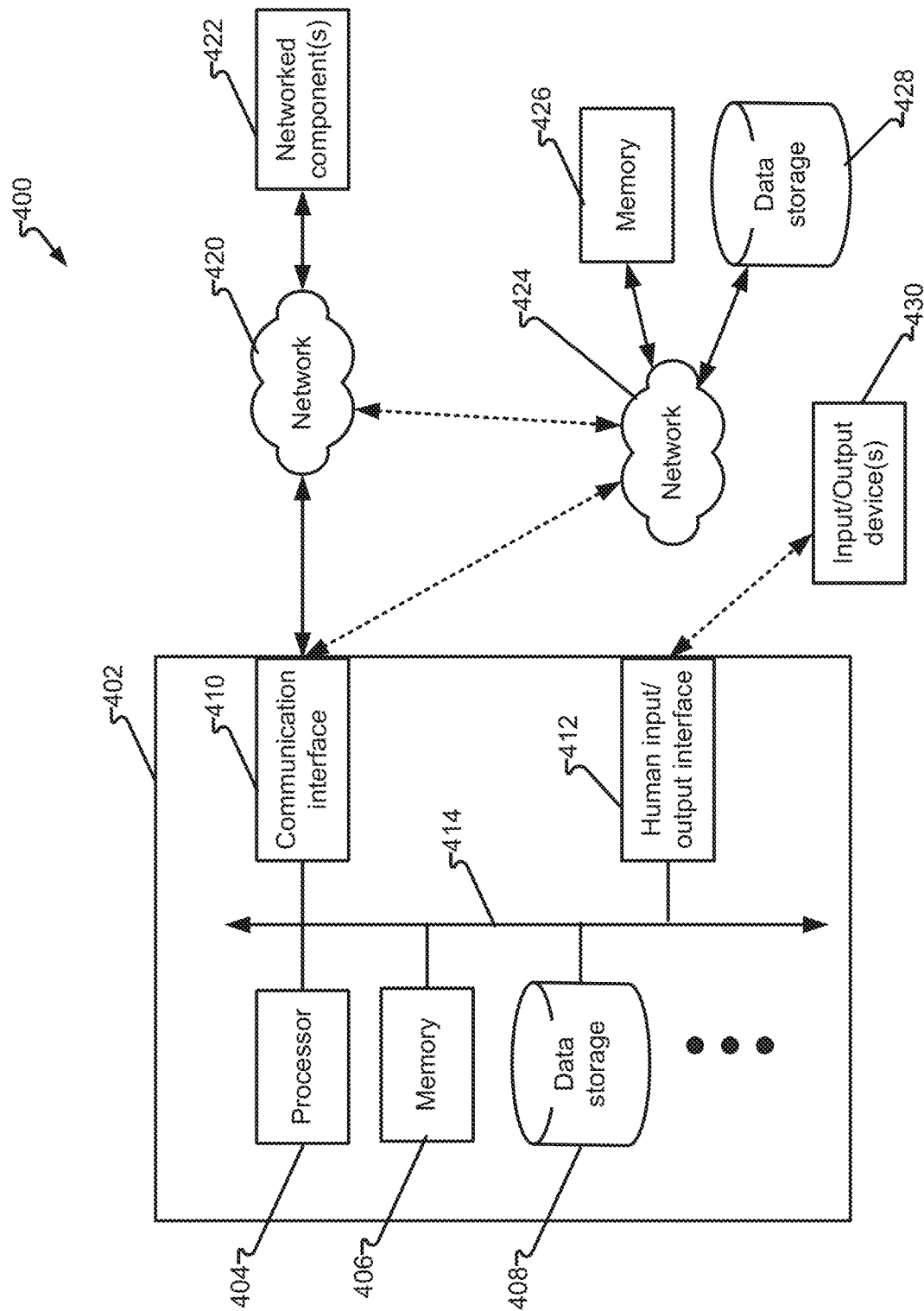
FIG. 4 depicts a third system in accordance with embodiments of the present disclosure.

FIG. 4 depicts system 400 in accordance with embodiments of the present disclosure. In one embodiment, primary communication device 104 may be embodied, in whole or in part, as device 402 comprising various components and connections to other components and/or systems. The components are variously embodied and may comprise processor 404. Processor 404 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 414, executes instructions, and outputs data, again such as via bus 414.

In addition to the components of processor 404, device 402 may utilize memory 406 and/or data storage 408 for the storage of accessible data, such as instructions, values, etc. Communication interface 410 facilitates communication with components, such as processor 404 via bus 414 with components not accessible via bus 414. Communication interface 410 may be embodied as a network port, card, cable, or other configured hardware device. Additionally or alternatively, human input/output interface 412 connects to one or more interface components to receive and/or present information (e.g., instructions, data, values, etc.) to and/or from a human and/or electronic device. Examples of input/output devices 430 that may be connected to input/output interface include, but are not limited to, keyboard, mouse, trackball, printers, displays, sensor, switch, relay, etc. In another embodiment, communication interface 410 may comprise, or be comprised by, human input/output interface 412. Communication interface 410 may be configured to communicate directly with a networked component or utilize one or more networks, such as network 420 and/or network 424.

Network 116 may be embodied, in whole or in part, as network 420. Network 420 may be a wired network (e.g., Ethernet), wireless (e.g., WiFi, Bluetooth, cellular, etc.) network, or combination thereof and enable device 402 to communicate with networked component(s) 422.

Additionally or alternatively, one or more other networks may be utilized. For example, network 424 may represent a second network, which may facilitate communication with components utilized by device 402. For example, network 424 may be an internal network to contact center #02 whereby components are trusted (or at least more so) that networked components 422, which may be connected to network 420 comprising a public network (e.g., Internet) that may not be as trusted. Components attached to network 424 may include memory 426, data storage 428, input/output device(s) 430, and/or other components that may be accessible to processor 404. For example, memory 426 and/or data storage 428 may supplement or supplant memory 406 and/or data storage 408 entirely or for a particular task or purpose. For example, memory 426 and/or data storage 428 may be an external data repository (e.g., server farm, array, "cloud," etc.) and allow device 402, and/or other devices, to access data thereon. Similarly, input/output device(s) 430 may be accessed by processor 404 via human input/output interface 412 and/or via communication interface 410 either directly, via network 424, via network 420 alone (not shown), or via networks 424 and 420.

It should be appreciated that computer readable data may be sent, received, stored, processed, and presented by a variety of components. It should also be appreciated that components illustrated may control other components, whether illustrated herein or otherwise. For example, one input/output device 430 may be a router, switch, port, or other communication component such that a particular output of processor 404 enables (or disables) input/output device 430, which may be associated with network 420 and/or network 424, to allow (or disallow) communications between two or more nodes on network 420 and/or network 424. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a network interface to a network;
a processor with access to a non-transient memory; and
wherein the processor performs:
receiving content from a primary device and broadcasting content to a secondary device, each via the network, and wherein the content received from the primary device comprises an audio portion and a text portion, wherein the audio portion comprises speech from a primary user associated with the primary device and the text portion comprising text generated from the speech;
determining whether the audio portion is complete;
upon determining that the audio portion is complete, broadcasting the content comprising the audio portion; and
upon determining that the audio portion is not complete, broadcasting the content comprising the text portion associated with the audio portion that is not complete and at least one of a leading text portion of the text portion prior to the audio portion that is not complete or a trailing text portion of the text portion after the audio portion that is not complete and wherein the at least one of the leading text portion or the trailing text portion comprises a complete sentence having the audio portion that is not complete.

2. The system of claim 1, wherein the secondary device comprises a plurality of secondary devices.

3. The system of claim 1, wherein the processor, upon determining the audio portion is complete, excludes the text portion from the content.

4. The system of claim 1, wherein the processor, upon determining the audio portion is not complete, excludes the audio portion from the content.

5. The system of claim 1, wherein the at least one of the leading text portion, further comprising a complete sentence prior to the sentence having the audio portion that is not complete, or the trailing text portion, further comprising a complete sentence after the sentence having the audio portion that is not complete.

6. The system of claim 1, wherein the at least one of the leading text portion, further comprising a number of words prior to the audio portion that is not complete, or the trailing text portion, further comprising a number of words after the audio portion that is not complete.

7. The system of claim 1, wherein the processor performs determining the audio portion is complete comprises, the processor generating a verification text by executing a speech-to-text conversion of the audio portion and comparing the text portion with the verification text and, upon determining the verification text and the text portion differ by more than a previously determined amount, determining that the audio portion is incomplete.

8. The system of claim 1, wherein the processor, upon determining the audio portion is not complete, further analyzes at least one of the text portion and the audio portion to derive replacement text associated with an absent portion of the audio portion that caused the audio portion to not be complete and providing the text portion comprising the replacement text.

9. The system of claim 1, wherein the processor, upon determining the audio portion is not complete, further analyzes at least one of the text portion and the audio portion to derive replacement speech associated with an absent portion of the audio portion that caused the audio portion to not be complete and providing the audio portion comprising the replacement speech.

10. The system of claim 9, wherein the replacement speech comprises previously recorded speech of the primary user.

11. A computer-implemented method of operating a conference server, comprising:
receiving content from a primary device and broadcasting content to a secondary device, each via a network, and wherein the content received from the primary device comprises an audio portion and a text portion, wherein the audio portion comprises speech from a primary user associated with the primary device and the text portion comprising text generated from the speech;
determining whether the audio portion is complete;
upon determining that the audio portion is complete, broadcasting the content comprising the audio portion; and
upon determining that the audio portion is not complete, broadcasting the content comprising the text portion associated with the audio portion that is not complete and at least one of a leading text portion of the text portion prior to the audio portion that is not complete or a trailing text portion of the text portion after the audio portion that is not complete and wherein the at least one of the leading text portion further comprising a complete sentence prior to a sentence having the audio portion that is not complete, or the trailing text portion further comprising a complete sentence after the sentence having the audio portion that is not complete.

12. The method of claim 11, wherein upon determining the audio portion is complete, excluding the text portion from the content.

13. The method of claim 11, wherein upon determining the audio portion is not complete, excluding the audio portion from the content.

14. The method of claim 11, wherein the at least one of the leading text portion, further comprising a number of words prior to the audio portion that is not complete, or the trailing text portion, further comprising a number of words after the audio portion that is not complete.

15. The method of claim 11, wherein determining the audio portion is complete further comprises generating a verification text by executing a speech-to-text conversion of the audio portion and comparing the text portion with the verification text and, upon determining the verification text and the text portion differ by more than a previously determined amount, determining that the audio portion is incomplete.

16. A system, comprising:
means to receive content from a primary device and broadcast content to a secondary device, each via a network, and wherein the content received from the primary device comprises an audio portion and a text portion, wherein the audio portion comprises speech from a primary user associated with the primary device and the text portion comprises text generated from the speech;
means to determine whether the audio portion is complete;
upon determining that the audio portion is complete, means to broadcast the content comprising the audio portion; and
upon determining that the audio portion is not complete, means to broadcast the content comprising the text portion associated with the audio portion that is not complete and at least one of a leading text portion of the text portion prior to the audio portion that is not complete or a trailing text portion of the text portion after the audio portion that is not complete and wherein the at least one of the leading text portion further comprising a complete sentence prior to a sentence having the audio portion that is not complete, or the trailing text portion further comprising a complete sentence after the sentence having the audio portion that is not complete.

17. The system of claim 16, wherein the secondary device comprises a plurality of secondary devices.

18. The system of claim 16, further comprising means to, upon determining the audio portion is complete, exclude the text portion from the content.

19. The system of claim 16, further comprising means to, upon determining the audio portion is not complete, excludes the audio portion from the content.

20. The system of claim 16, wherein the at least one of the leading text portion, further comprises a number of words prior to the audio portion that is not complete, or the trailing text portion, further comprising a number of words after the audio portion that is not complete.

* * * * *